United States Patent [19]

Crawford et al.

[11] 4,384,354

[45] May 17, 1983

[54] NOISE MARGIN MEASUREMENT AND ERROR PROBABILITY PREDICTION

[75] Inventors: Thomas M. Crawford, Balerno; Alastair S. Reynolds, Linlithgow Bridge; Ivan R. Young, Kirkliston, all of Scotland

[73] Assignee: Hewlett-Packard Limited, South Queensferry, Scotland

[21] Appl. No.: 212,373

[22] Filed: Dec. 3, 1980

[30] Foreign Application Priority Data

Dec. 14, 1979 [GB] United Kingdom ................. 7943265
Sep. 24, 1980 [GB] United Kingdom ................. 8030841

[51] Int. Cl.$^3$ .............................................. H04B 3/46
[52] U.S. Cl. ...................................... 375/10; 364/554; 328/164
[58] Field of Search ...................... 375/10; 370/13, 17; 364/578, 582, 481, 486, 554; 455/67; 328/162, 164; 340/146.3 S

[56] References Cited

U.S. PATENT DOCUMENTS

| 3,497,684 | 2/1970 | McKiernan | 364/554 |
| 3,731,011 | 5/1973 | Lachaise | 179/175.31 R |
| 3,898,564 | 8/1975 | Waldhauer et al. | 328/164 |
| 3,944,929 | 3/1976 | Matsuo | 455/145 |
| 3,965,294 | 6/1976 | Renz et al. | 375/10 |
| 4,090,242 | 5/1978 | Lerma et al. | 375/10 |

FOREIGN PATENT DOCUMENTS 1261749 1/1972 United Kingdom.

OTHER PUBLICATIONS

Van den Elzen, 'On the Theory and the Calculation of Worst Case Dye Openings in Data-Transmission Systems', by Philips Research Reports 30, vol. 30, No. 6, 1975.

Primary Examiner—Benedict V. Safourek
Assistant Examiner—Stephen Chin
Attorney, Agent, or Firm—Patrick J. Barrett

[57] ABSTRACT

This invention relates to method and apparatus for measuring noise margins in digital transmission systems. The method requires the introduction of a variable pulse into a sequence of pulses which represents normal traffic, varying a parameter of the pulse, detecting the pulse, and accumulating information concerning the variations to determine probability distribution of the deviations produced by measuring the variations relative to a standard. The apparatus includes means for introducing the variable pulse into a sequence of pulses and for observing and recording detection of the variable pulse in each sequence to compile a probability distribution of the aforementioned deviations.

37 Claims, 25 Drawing Figures

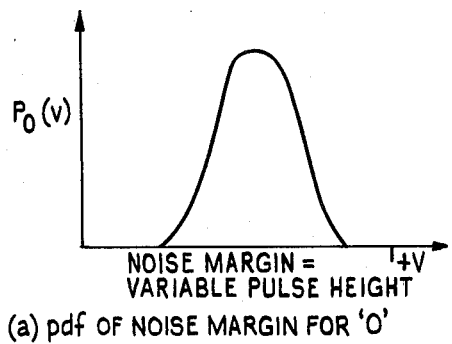
(a) pdf OF NOISE MARGIN FOR '0'
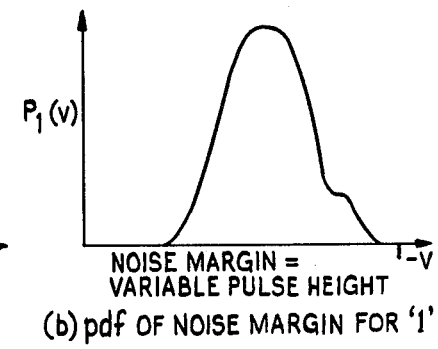
(b) pdf OF NOISE MARGIN FOR '1'
FIG. 4
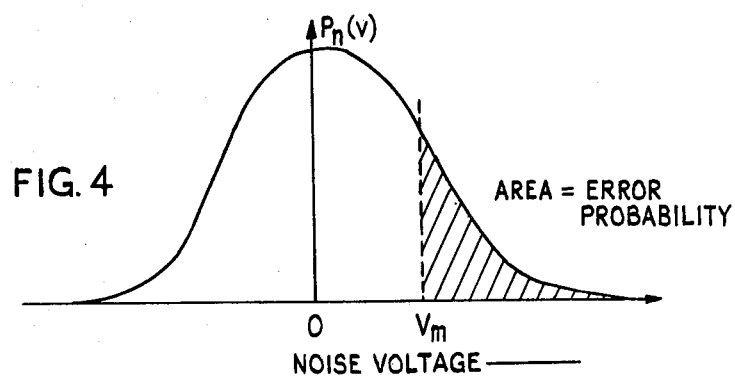
(c) pdf OF NOISE $P_n(v)$ AND ERROR PROBABILITY FOR STATE WITH NOISE MARGIN $V_m^n$
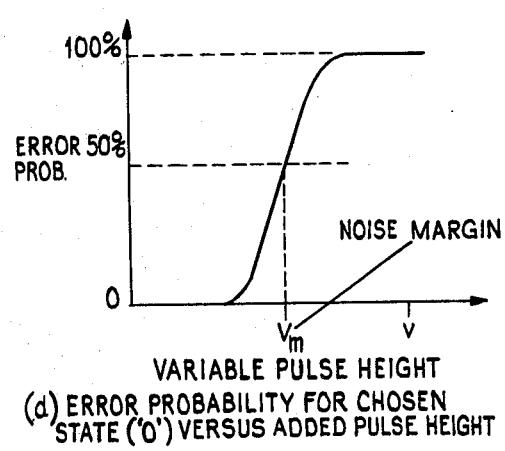
(d) ERROR PROBABILITY FOR CHOSEN STATE ('0') VERSUS ADDED PULSE HEIGHT
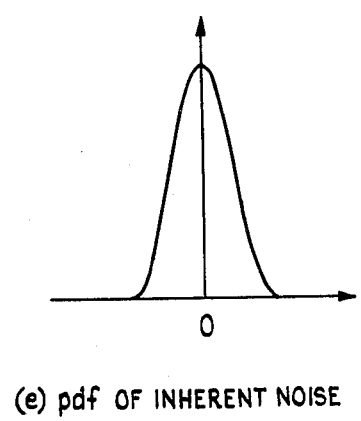
(e) pdf OF INHERENT NOISE

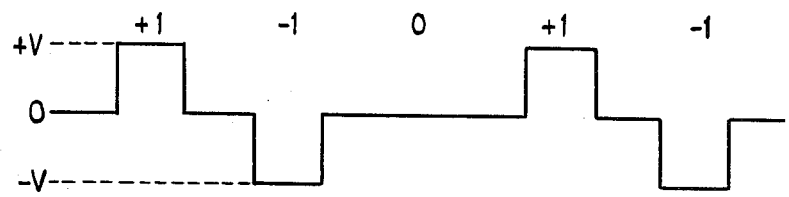
(a) TERNARY LINE SIGNAL
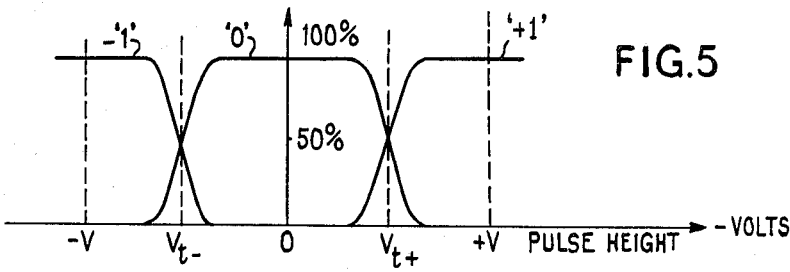
FIG.5
(b) PROBABILITY OF STATE DETECTED IN RECEIVER VERSUS MAGNITUDE OF TRANSMITTED PULSE
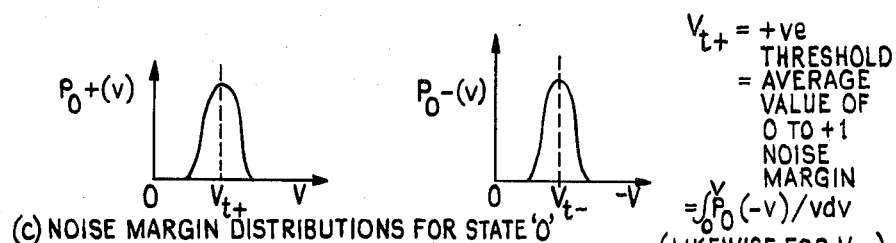
$V_{t+}$ = +ve THRESHOLD = AVERAGE VALUE OF 0 TO +1 NOISE MARGIN
$= \int_0^V P_0(-v)/v\, dv$
(LIKEWISE FOR $V_{t-}$)
(c) NOISE MARGIN DISTRIBUTIONS FOR STATE '0'
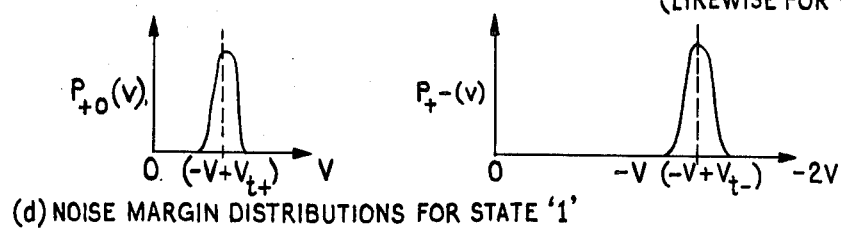
(d) NOISE MARGIN DISTRIBUTIONS FOR STATE '1'
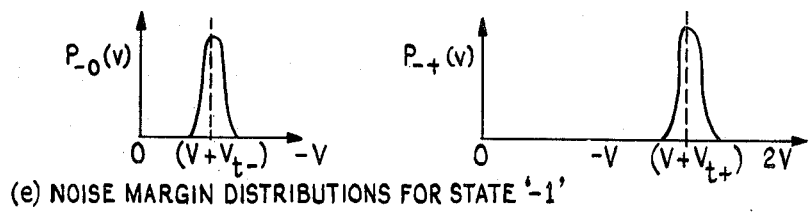
(e) NOISE MARGIN DISTRIBUTIONS FOR STATE '-1'

CALCULATOR INTERFACE ADDRESS INFORMATION

| ADDRESS | DATA BITS | DESCRIPTION |
|---|---|---|
| 0<br>1 | Bits 0 → 7<br>Bits 0 & 1 | 10 bits defining trigger word position in PRBS sequence |
| 2 | Bits 0 → 6<br>Bit 7 | Defines TP 0 - 100%<br>Defined 0 = +ve 1 = -ve |
| 3 | Bits 0 → 2 | Defines TP status<br>Bit 0 = 1; Information valid<br>Bit 1 = 1; TP is -ve<br>Bit 2 = 1; TP is a data (1) |
| 4 | All Bits | Resync. the 3786A Receiver section. |
| 5 | Bits 0 → 2 | Receiver ERROR STATUS<br>Bit 0 = 1; TP error<br>Bit 1 = 1; Extraneous Error<br>Bit 2 = 1; Information Valid |

Example: Set the trigger word to all 1's ten bit word
9825A Program as follows:-

0 : wti 6, cmp 0; wtb 2, cmp 255
1 : wti 6, cmp 1* 256; wtb 2, cmp 3.

FIG.9

If the T.P. position (P) is nominally a 0 and if an error is present (E) decrement T.P. i.e. I = −1 the following conditions are also true.

```
P E I
0 0 1
0 1 -1
1 0 -1
1 1 1
```

Lines 28, 29

N + I = N set new T.P. height taking into account increment direction and T.P. polarity Y:
N + Y = New T.P. Height : Line 31

If T.P. error is present 1 → E.
Line 32.

Line 33

```
0 +ve result increments  P(N)
0 -ve    "         "     Q(N)
1 +ve    "         "     R(N)
1 -ve    "         "     S(N)
```

Lines 34 → 51.

NOISE MARGIN MEASUREMENT AND ERROR PROBABILITY PREDICTION

This invention is concerned with improvements in or relating to method and apparatus for measuring noise margins in digital transmission paths of digital transmission systems and with the prediction of error probability therein.

BACKGROUND OF THE INVENTION

In a digital transmission system a transmitted signal is constrained to one of a set of possible states. These states might be distinguished by differences in pulse amplitude, position, or width, or by differences in amplitude, phase or frequency of a carrier, or by combination of some of these. What all these methods have in common is the use of a set of distinct transmit stages. The receiver of the system in order to decode the signal, has to recognise each received state correctly. This is made more difficult by a combination of attentuation along the transmission path and noise added to the signal. The noise is generated from a variaety of potential sources, e.g. thermal noise or crosstalk noise from other transmission systems. This perturbs the perceived value of the received signal from its ideal value. The receiver thus has to decide which of the allowed set of transmitted states was most likely to have been sent. If the perturbation is large enough the wrong decision is made and an error or errors are then incorporated in the receiver's digital output(s).

In any transmission system the transmitted signal is modified by the characteristics of the transmission channel as it propagates through it. When the information content of the signal is in digital form, channel impairments will appear as inter-symbol interference (ISI). That is, the energy transmitted in any one baud period is no longer confined to that period when received, but has become smeared over several periods. Modest levels of ISI may only reduce the noise margin of the received bauds whilst larger levels can make the signal completely unreadable without equalization. Perfect equalization consists of passing the received signal through a network whose transfer function is the inverse of the channel's. Perfection, however, is neither attempted nor is it desirable. What is attempted is to reduce the value of ISI at the decision point to zero at the sampling instants.

PRIOR ART

The presently accepted method of measuring the tolerance of digital transmission systems to noise, is to add a known amount of noise of the desired spectral density and amplitude probability distribution to the signal. This is usually either the normal line signal or a pattern with statistics that approximates the normal signal. With the noise added the receiver output is monitored and any errors counted. Repeating this for a range of different noise powers allows a plot of error probability versus the noise power or versus the signal-to-noise ratio to be drawn.

This method has several disadvantages. Firstly, to generate noise of the required spectral density and amplitude characteristics is not trivial. Secondly, to measure the low error rates produced at typical system signal-to-noise ratios takes an inordinately long time. The performance is therefore usually checked at much higher levels of noise and the results extrapolated. The large noise powers concerned have the potential of disturbing the system being tested making the results suspect.

In a report (No. 6930) of the Australian Post Office Research Laboratores entitled "A Prototype Primary Level PCM Regenerator Threshold Level Tester" by G. J. Semple and L. J. Millot and dated Nov. 1974, there is disclosed the prototype of a test unit for measuring decision theshold levels of a primary level PCM regenerator. The unit is also stated to be useful for making measurement of intersymbol interference (ISI) produced by equalized pulses at the decision point in the regenerator which is being tested.

The apparatus disclosed in this report includes a manually-programmed 16-bit word generator, and means for varying the height of a pulse at a selectable location in a first word, produced by the generator, of a sequence of identical words (there may be 2, 4, 8 or 16 words). The variation of pulse height can only be effected by manual control of the height varying means. The apparatus is also capable of indicating detection of an error in a PCM regenerator when a pulse has been varied so that it can be sensed as being of a value other than its initial value.

However, a 16-bit word, even though repeated up to 16 times, can not be representative of normal traffic in a digital transmission system where the combination of '0's and '1's (+ or −) is more variable than can be represented by a 16-bit word. Thus a regenerator under test can not be tested under normal work conditions but only under the conditions imposed by using the 16-bit word.

The primary degeneration of transmitted information in a digital transmission system is due to noise, and the tolerance of the system itself to noise is of paramount importance. It is therefore essential to be able to measure the noise margins in a system and to compile from these measurements the noise margin distribution in the system, for example by histogram compilation.

The apparatus referred to in the above report could not be used for making measurements of noise in this manner because it utilizes a 16-bit word generator and can not simulate normal traffic conditions. In the context of this report, there is no suggestion to use a longer sequence than 16-bits because the problems to which the report is directed did not require use of a sequence of more than 16 bits.

In measuring noise margins and their distributions, it is essential to be able to vary the position of a variable pulse over a large number of pulse positions (typically many more than 16) so that the variable pulse can be examined in the environment of different sequences of preceding and succeeding pulses.

THE PRESENT INVENTION

The present invention provides a method and apparatus for measuring noise margins in a digital transmission system comprising a receiver. In carrying out such a method using apparatus according to a preferred embodiment of the invention, a repeatable sequence of pulses, representative of normal traffic along a given transmission path of the system is generated and a further pulse of a specific state is also generated. At a selected location within the sequence of pulses, one pulse is removed and the further pulse is inserted. The further pulse has a parameter (e.g. amplitude), the value of which is variable within the sequence so that the pulse can be detected by a detector circuit of the system. These steps are then repeated with the pulse at a number of selected positions within the sequence, each position being predetermined and repeatable, and for each position and repetition, detecting change of state of the pulse. The values of variations of the selected parameter are then compared with a selected reference value and collected as deviations from that reference value to determine the probability distribution of the deviations.

The term "noise margin" where used herein in relation to a pulse (also defined) means the variations of at least one parameter (e.g. amplitude) of that pulse from a normal value of that at least one parameter so that said pulse is detected by a detector of the transmission system as being in a state which is different from its normal state.

The term "pulse" is used herein to include an interval during which the transmission system has impressed upon it one signal of a predetermined set of signals, each signal of the set being distinguished by variations of at least one parameter thereof, for example voltage level, duration or timing or variations in phase, frequency or amplitude of a carrier, or combinations thereof during said interval.

In the preferred embodiment of the invention, it is considered to be more advantageous to remove a pulse from the sequence and then to replace that pulse by a variable pulse rather than simply to adjust an existing pulse by superimposing another, variable, pulse thereon for this latter course can lead to inaccuracies due to misalignment of the two pulses.

Said sequence of pulses may be produced by a first amplifier in response to input signals from a pseudo random sequence generator, and said pulse may be produced by a second amplifier, the two amplifiers being controlled in a manner such that said pulse replaces said pulse of said sequence at said predetermined position. The provision of two amplifiers allows the pulse parameter, e.g. where voltage is being measured, the height of the pulse to be varied rapidly from one pulse to the next.

An initial value of said at least one parameter may be set at a level selected to correspond to a predicted probable detector threshold value between two adjacent states. Thus, the height of the pulse, where voltage is the parameter, can be set as close as possible to the expected noise margin to reduce measurement time.

It is preferred that data accumulated from step (e) is used to adjust said initial value of said at least one parameter as necessary; this allows continuous up-dating and re-evaluation of parameters.

Step (c) may comprise generating a reference sequence of pulses as an output from a pseudo random sequence generator and synchronously comparing this reference sequence with the sequence in the system, and detecting differences between the two sequences. When the method is carried out in this manner, it is possible to detect an error at the variable pulse position in a sequence or at any other position in the sequence, although the latter is not of interest in measuring noise margins. However, detection of an error in a position other than the variable pulse position does enable loss of synchronization to be detected. Alternatively, step (c) may comprise, for a coded sequence, examining the sequence in the system to establish that the pulses within the sequence conform to the code of said coded sequence. If this alternative was employed, less hardware would be required.

A method according to the invention as described above is primarily useful in measuring noise margins and their distributions in a PCM regenerator as used in a digital transmission system, but the method can also be applied for making similar measurements on a memory or storage device.

The apparatus according to the preferred embodiment of the present invention includes means for determining the state of the variable pulse, for monitoring the value of its parameter and for accumulating the values as aforesaid. These means are provided by data processing means programmed to control the position of said pulse within said sequence, the variation of said at least one parameter and the accumulation of data. Thus the apparatus can be designed and the data processing means programmed so that when used, for example, to test a PCM regenerator, an engineer can receive simply a pass or fail indication from the apparatus indicating that the regenerator is satisfactory or unsatisfactory as the case may be. In the alternative, and, perhaps, more suitably for use in a laboratory environment, the use of data processing means, appropriately programmed, allows a plotter or a visual display unit to be employed to study, for example, histograms of noise margin distribution in evaluating the characteristics of a regenerator.

It is preferred that means is provided for generating a predetermined subsequence of said sequence and said means for providing said variable pulse is triggered by identity between said subsequence and a subsequence portion of said sequence. By providing the variable pulse in the subsequence, which may be, for example, of 10 bits length, it is possible to uniquely locate the pulse produced by the sequence providing means (which may be a pseudo random binary generator) in a sequence of $2^{10}$ pulses.

Means may be provided for inhibiting generation of a pulse in said sequence at said predetermined position in response to said identity between said subsequence and said subsequence portion of said sequence.

Apparatus according to the present invention is most useful in the testing of PCM regenerators in PCM transmission lines where the measurement of noise margins and their distributions is essential in predicting the performance of the regenerator before it is located in situ.

Thus, in an apparatus according to the invention, a transmission line is preferably provided to said receiver from a transmitter which is capable of transmitting a variable pulse. Alternatively, the transmission path to said receiver may comprise free space.

The present invention further provides a method of predicting error probability in a digital transmission system, the method comprising (i) determining probable noise margin distribution in the system, as necessary, by carrying out steps (a) to (e) of the method according to the invention referred to above; (ii) for each state and for each distribution relating to that state, quantizing the deviations into ranges of values; (iii) for each range of values, determining the error probability, contributed to total error probability in the system, by all values within each range; and (iv) summing the error probabilities for each range of values within each distribution for each state.

As with the preceding method according to the invention, it is preferred that said specified state of said pulse is one of n possible states and steps (a) to (e) are repeated for each of said n possible states, the variation of said at least one parameter being such as to allow a detected state to be any one of said n possible states, and the method also comprising the step of further classifying the parameter variations according to the detected states and said each of said n states prior to the accumulating step. By repeating steps (a) to (e) as many times as is necessary, histograms of noise margin distribution can be constructed for that state of the pulse. n may equal 3, because we are primarily concerned, in a digital transmission system, with a ternary signal, which is composed of sequences of '0's, '+1's and '−1's.

The method we have developed can be used to predict the error probability in regenerators down to extremely low levels. It measures the system while under normal (i.e. low noise) operating conditions and does not require an expensive difficult-to-calibrate hardware noise source. No access is required to internal circuit nodes and the results give some measure of diagnostic insight into any malfunctions.

BRIEF DESCRIPTION OF THE DRAWINGS

There now follows a detailed description which is to be read with reference to the accompanying drawings of methods and apparatus according to the present invention; it is to be clearly understood that these methods and apparatus have been selected for description to illustrate the invention by way of example and not by way of limitation.

In the accompanying drawings:

FIGS. 4($a$) and 4($b$) are graphs illustrating probability density functions of noise margin for '0' 1 and a '1' transmitted state respectively;

FIG. 4($c$) is a graph illustrating probability density function of noise $P_n(v)$ and error probability for a transmitted state with noise margin $V_m$;

FIG. 4($d$) is a graph of error probability for a selected transmitted state '0' versus added pulse height;

FIG. 4($e$) is a graph of the probability density function of inherent noise in a transmission line;

FIG. 5($a$) illustrates a ternary line signal;

FIG. 5($b$) is a graph of the probability of a state detected in a receiver of a regenerator versus the magnitude of the transmitted pulse;

FIGS. 5($c$) and 5($d$) are graphs illustrating noise margin distribution for '0' and '1' states respectively;

FIG. 5($e$) shows noise margin distribution for a '−1' state;

FIG. 9 is a table of calculator interface address information; and

DESCRIPTION OF THE PREFERRED EMBODIMENT

Figure 1:
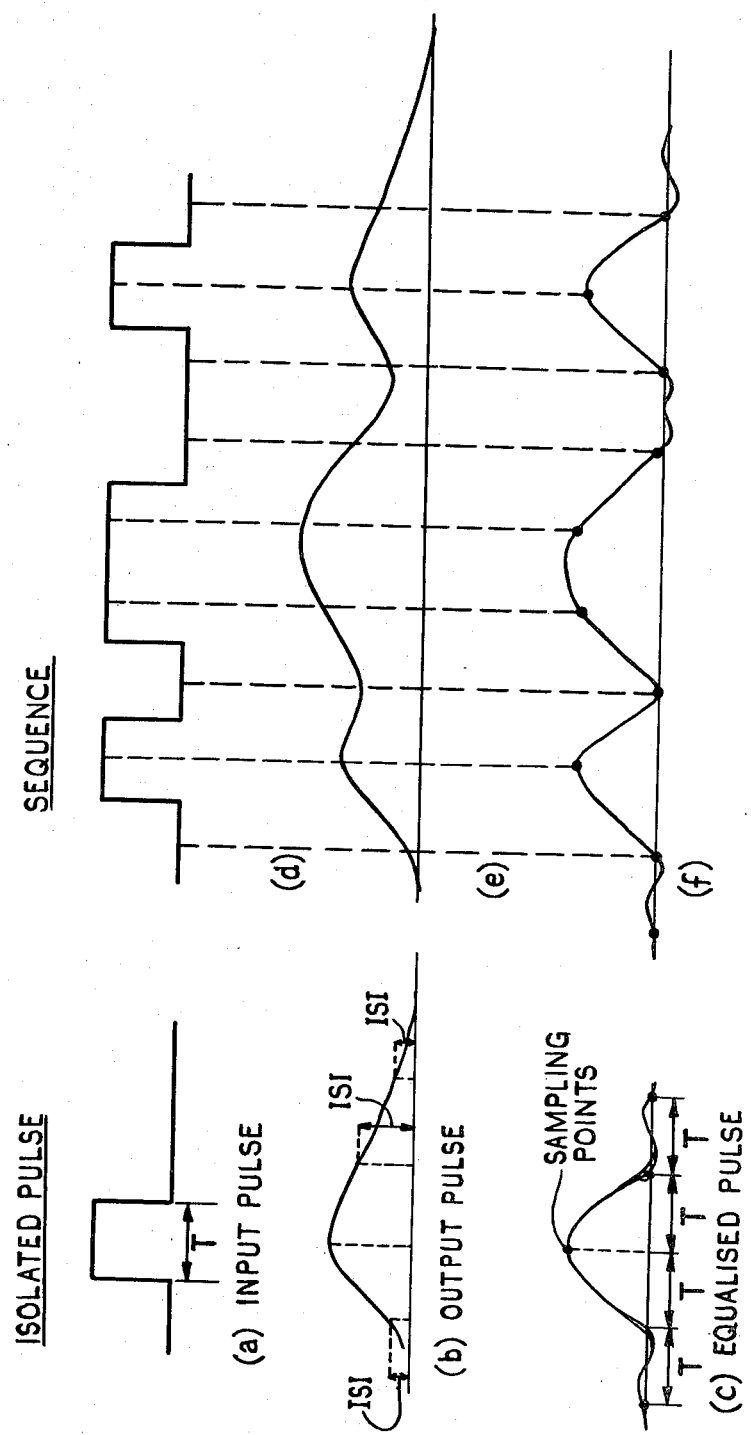
FIG. 1 is a diagram illustrating an input pulse and a sequence of input pulses, the effect of attenuation and noise in a transmission line, and subsequent equalization.

As discussed above, a transmitted signal in a given transmission system is affected by the various characteristics of the transmission line as the signal travels along the line. With the information content of the signal in digital form (FIGS. 1($a$) and 1($d$)), the effect of these various characteristics will appear as inter-symbol interference (ISI) as shown in FIGS. 1($b$) and 1($e$), the result of which is that a single pulse will effectively become extended beyond its original pulse width to affect adjacent pulses. Low levels of ISI may only reduce the noise margin of the received bands whilst higher levels can render a signal completely unreadable without the signal being equalized. Perfect equalization, as mentioned before, consists of passing the received signal through a network whose transfer function is the inverse of that of the channel. Perfect equalization is not desirable and instead, it is intended that the values of ISI are reduced at the decision point to zero at the sampling instants (FIGS. 1($c$) and 1($f$)).

The general principles governing our invention are based upon the considerations set forth above. A repetitive sequence of states is transmitted over a digital transmission system (DTS) and one state within that sequence is considered. The transmission conditions are assumed fixed. The received value of that state varies from the ideal because of noise and inter-symbol interference (ISI). The noise is a random perturbation and varies with every repetition of the pattern, while the ISI is constant and depends on the adjoining states. If the distribution of received values for that state could be measured, then the extra perturbation needed to cause an error could be found. This assumes knowledge of the receiver's decision threshold values, i.e. the points at which the receiver's circuitry changes its classification of the received value from one state to another. Call this value for the added perturbation the noise margin. If there are n possible states there will be n−1 values or ranges of noise margin. Each corresponds to a different incorrect state being detected. Noise margin is not necessarily a singly dimensioned quantity. For example, a combined amplitude/phase modulation system will have its noise margins expressed as a combined function of amplitude and phase. From the noise margin and knowledge of the amplitude characteristics of the noise source, the error probability for that state and with that noise source connected to the input can be calculated. If the noise margin of all the states in the sequence is known then the error probability for that sequence can also be calculated. This can be done for any value or type of noise.

Our method measures the noise margin by a noncontact method requiring no access to points internal to the receiver. It is described below as being applied to a binary line transmission system with only two transmit states. The same basic method can be extended to systems with any number of states carried by any form of digital transmission system.

Figure 2:
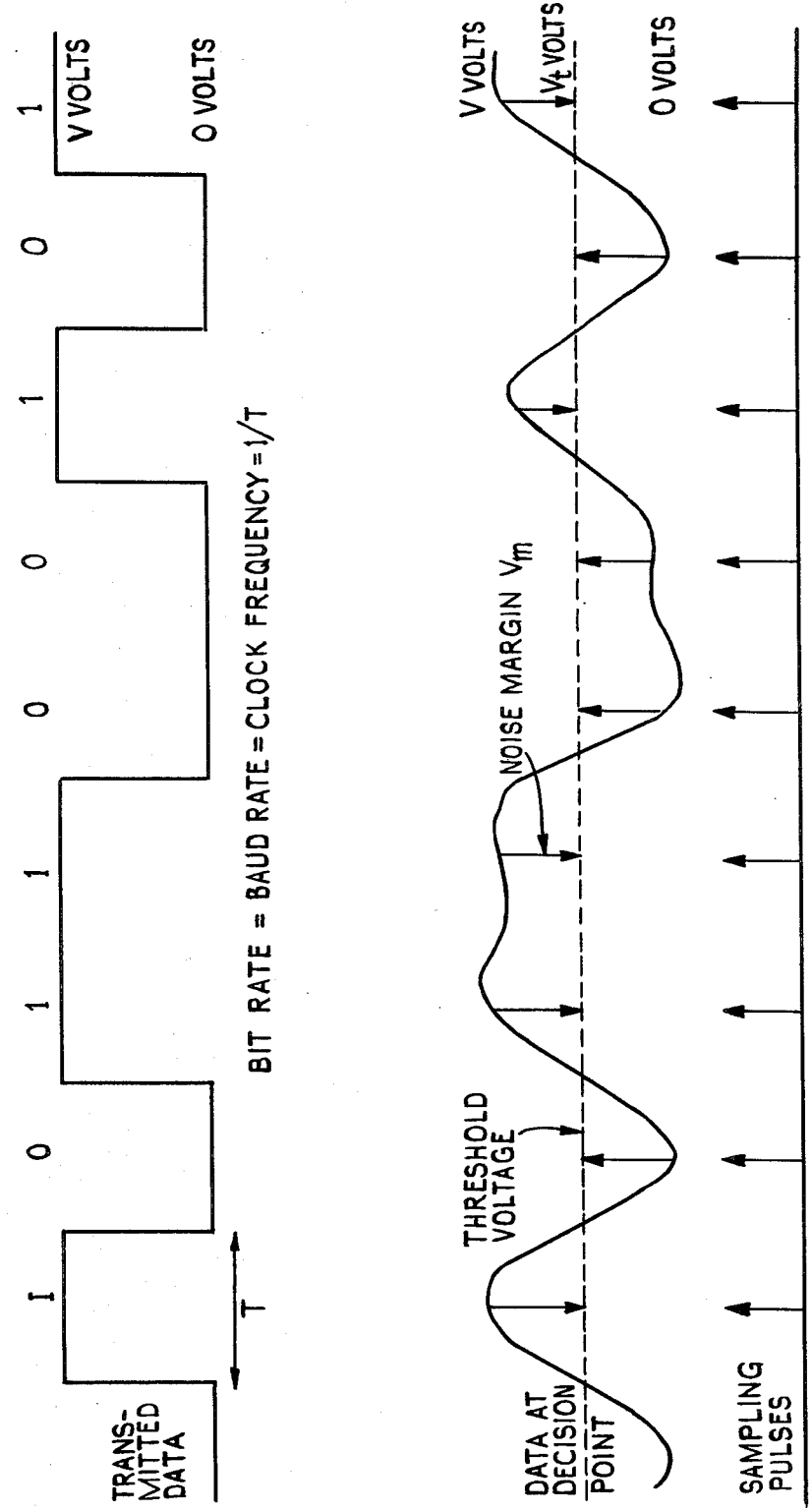
FIG. 2 is a diagram illustrating a sequence of pulses in a simple binary line system.
Figure 3:
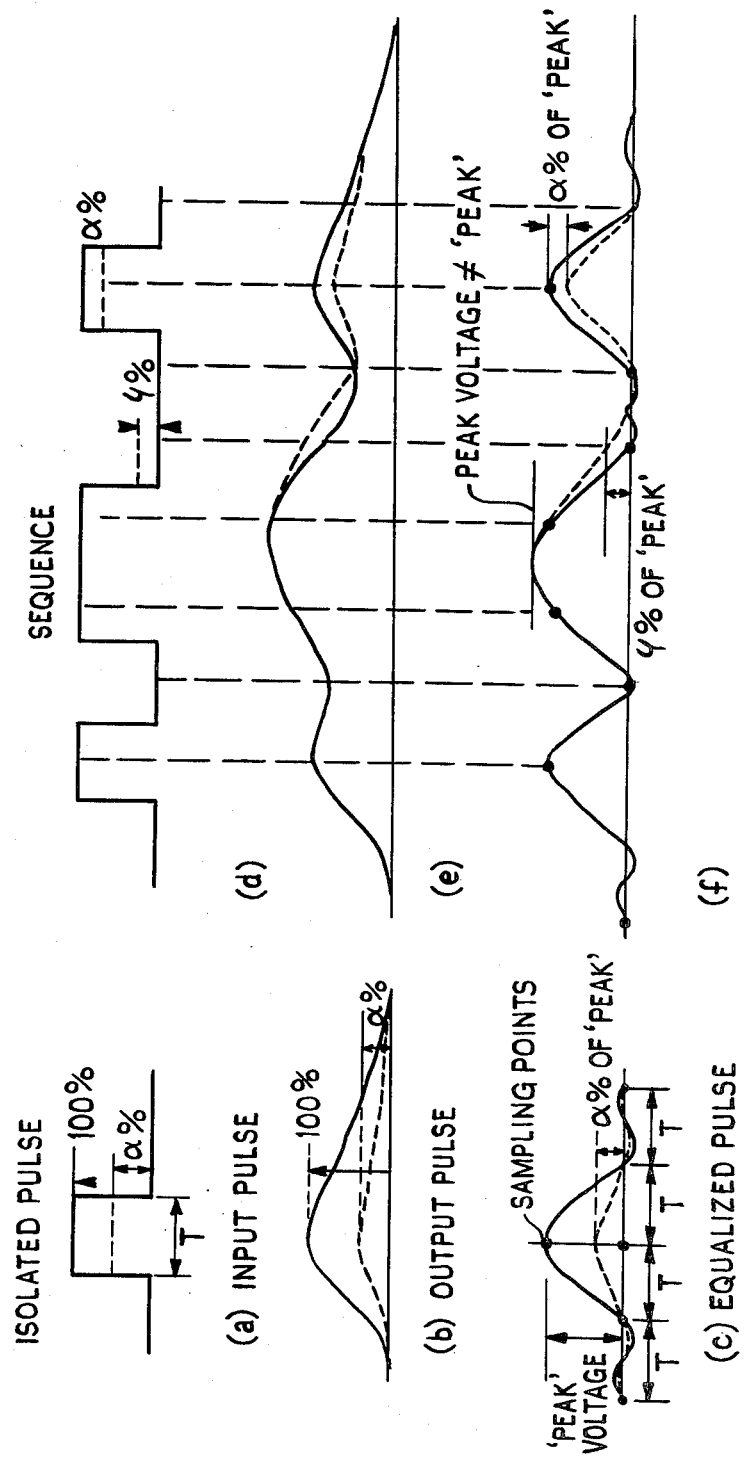
FIG. 3 is a diagram illustrating the response to a modified pulse of a single pulse and a sequence of pulses in a simple binary line system.

Consider a simple binary system which has two transmit states 0 volts and V volts represented by '0' and '1' respectively (FIG. 2). This has a fixed repetitive pattern transmitted through it, for example, a pseudo random binary sequence (PRBS). One bit in this sequence is selected. To measure the noise margin of this bit in the receiver the transmitted value of this pulse is perturbed by adding a signal to it. It is desirable to do this with minimum disturbance to the received values of the adjoining states and to be able to calculate the effect of the added signal at the receiver's decision point without access to that point. The most suitable signal is one identical in form to that normally transmitted, but of variable amplitude. Thus the added signal suffers exactly the same attenuations, delays, amplification etc. as the normal signal and will appear at the decision point still identical in form to a normal signal however distorted that is. Thus if it is 10% of the normal signal height at the transmitter, when it appears at the decision point it will be 10% of the signal height at that point. (FIGS. 3(a), 3(c), 3(e)).

The noise margin of the selected bit can be measured by adding the variable pulse at progressively larger amplitudes to that bit and checking the receiver output state as the transmitted value is gradually shifted from one state towards the other. At some value of the variable pulse the receiver will start detecting that bit as the other state. If there is no noise in the system the change happens at a sharply defined level. If there is noise the change happens over a range of amplitudes of the variable signal. If the probability of receiving that bit incorrectly is plotted against variable pulse amplitude, some information about the amplitude probability density function and the standard deviation of the noise can be deduced from its width and shape. This type of noise is referred to as inherent noise. The value of the variable pulse amplitude at 50% probability gives the average noise margin for that bit, and contains information about the ISI and the accuracy of the receiver's decision thresholds.

Repeating the above procedure for other bits within the sequence will in general give different results because the ISI depends on the adjoining states. The noise component should be identical. These results can be used to build up a histogram of average noise margin for each transmitted state. In this case there are two, one for state '0', namely P0(v), and one for state '1', P1(v), where v varies from 0, when no signal is added, to + or −V when a full height signal is added. Both distributions are normalised to unit area so that they become probability density functions. The probability of a state having a noise margin Vm is then P1(Vm) or P0(Vm) for a 1 or 0 respectively (see FIGS. 4(a), 4(b). The effect at the decision point is thus scaled in terms of the effect of an isolated pulse at that point. Thus a noise margin of 0.4 V represents a noise margin of 40% of the signal produced by an isolated pulse at the decision point at the sampling time. Ideally sampling should occur at the time corresponding to the peak value. This is for maximum noise immunity. Then the noise margin is scale in terms of the peak signal produced by an isolated pulse at the decision point. This is not the same as the actual peak at the decision point produced by transmitting a complex sequence. ISI causes the individual pulses to have differing heights and the signal peaks can be greater or smaller than that from an isolated pulse. (See FIGS. 3(b), 3(d), 3(e)). The error probability for the system can now be estimated provided the probability density function (pdf) of the noise signal's amplitude at the decision point is known. This is Pn(v).

Consider state '0'. For any particular value of noise margin Vm the probability of an error occurring is the probability of the noise signal being greater than the noise margin, i.e.:

$$Pe = \int_{Vm}^{\infty} Pn(v) \cdot dv \quad O <= Vm <= V \text{ (FIG. 4(c))} \quad (1)$$

Thus for all zeroes $$Pe = \int_{O}^{V} P0(Vm) \cdot \int_{Vm}^{\infty} Pn(v) \cdot dv \cdot dVm \quad (2)$$

For complete generality the limits of integration for Vm should be +, −∞. This should also be the range of the measurement. For any practical system however, the error probability is zero when unaltered pulses are transmitted. That is P0(Vm)—>0 as Vm—>0 or V.

For state '1' the added noise signal must be negative to cause an error:

$$Pe = \int_{Vm}^{-\infty} Pn(v) \cdot dv \quad O => Vm >= -V \quad (3)$$

Thus for all ones:

$$Pe = \int_{O}^{-V} P1(Vm) \cdot \int_{Vm}^{-\infty} Pn(v) \cdot dv \cdot dVm \quad (4)$$

To find the total probability of errors in the whole sequence multiply the two expressions for '1' and '0' by the respective probabilities of these states in the transmitted sequence −P(1) and P(0).

$$Pe = P(O) \cdot \int_{O}^{V} P0(Vm) \cdot \int_{Vm}^{\infty} Pn(v) \cdot dv \cdot dVm + P(1) \cdot \int_{O}^{-V} P1(Vm) \cdot \int_{Vm}^{-\infty} Pn(v) \cdot dv \cdot dVm \quad (5)$$

This gives the probability of an error being caused by a noise source with pdf Pn(v) for the given sequence. If the sequence closely resembles in its statistics the normal transmitted signal over the transmission channel, then the calculated error rate will apply to that signal also. The noise in the above expression is the sum of two components. One is the noise present at the sampling point even with a perfect noise-free signal present at the receiver input- the inherent noise. The second is the noise added by external noise sources to the receiver input signal. For any particular receiver input state the pdf of the inherent noise can be estimated from the measurement of error rate versus variable pulse height. For a linear system this noise will be independent of the state chosen. For other systems it need not and separate estimates will need to be made for each state.

Let the error rate as a function of variable pulse height be R(v) and let K be the pulse height for 50% error rate. Then the cumulative pdf on the inherent noise is:

$$Qi(v) = R(v+K) \quad \text{(FIG. 4(d))} \quad (6)$$

and the pdf of the inherent noise is the derivative of this:
$$Pi(v) = dR(v+K)/dv \quad \text{(FIG. 4(e))}. \quad (7)$$

This distribution is scale in terms of the 'peak' signal at the sampling point. To find the combined effect of the external and inherent noise sources the two respective pdf's should be convolved, ps $$Pn(v) = Pi(v)*Pe(v) \tag{8}$$

here '*' (in this case only) signifies convolution and Pe(v) is the pdf at the sampling point of the externally added noise. This also must be scaled in terms of the 'peak' signal.

PCM REGENERATOR

Now consider the case of a PCM line regenerator as used in the British Post Office's 2.048 Mb/s digital line systems. The line signal has three states '+1', '−1', and '0' with +V, −V and 0 volt half width return to zero pulses. V is normally 3 volts and the line a 120 ohm twisted pair. Extending the above to this, we have Po+(v) is distribution of noise margin for 0 being detected as +1

Po−(v) is distribution of noise margin for 0 being detected as −1

P+o(v) is distribution of noise margin for +1 being detected as 0

P−o(v) is distribution of noise margin for −1 being detected as 0

P+−(v) is distribution of noise margin for +1 being detected as −1

P−+(v) is distribution of noise margin for −1 being detected as +1

There are three transmit states and therefore one correct and two incorrect detected states for each. This gives the total of six noise margin distributions. Looking at each possible error in turn:

0−>+1 errors

Let P(+/0) be the probability of receiving a +1, given that a 0 was transmitted $$P(+/0) = \int_0^V Po + (Vm) \cdot \int_{Vm}^\infty Pn(v) \cdot dv \cdot dVm \tag{9}$$

0−>−1 errors $$P(-/0) = \int_0^{-V} Po - (Vm) \cdot \int_{Vm}^{-\infty} Pn(v) \cdot dv \cdot dVm \tag{10}$$

−1−>+1 errors $$P(+/-) = \int_0^{2V} P - + (Vm) \cdot \int_{Vm}^\infty Pn(v) \cdot dv \cdot dVm \tag{11}$$

−1−>0 errors

This is more complicated because large noise voltages cause a −1 to +1 error rather than a −1 to 0 error. Therefore find the total error probability and substract that due to −1 to +1 errors.

$$P(0/-) = \int_0^V P - o(Vm) \cdot \int_{Vm}^\infty Pn(v) \cdot dv \cdot dVm - P(+/-) \tag{12}$$

+1−>−1 errors $$P(-/+) = \int_0^{-2V} P + - (Vm) \cdot \int_{Vm}^{<\infty} Pn(v) \cdot dv \cdot dVm \tag{13}$$

+1−>0 errors $$P(0/+) = \int_0^{-V} P + o(Vm) \cdot \int_{Vm}^{-\infty} Pn(v) \cdot dv \cdot dVm - P(-/+) \tag{14}$$

The limits for integration are again chosen for practical reasons. To be completely general the limits for integration over Vm should be $+\infty, -\infty$. As explained when discussing the simple binary case we can limit the range of Vm. All the Pxy(Vm) should tend to zero as the transmitted state approaches either state x or y. The integration need therefore only be done over this range.

The total error probability is the sum of the six individual probabilities. Some simplifications are possible. The first is to ignore +− and −+ errors. For any reasonable error rate the probability of these errors is insignificant compared with the others. On average they will have a noise margin of about 3V/2 compared with V/2 for o−, +o, o+, o− errors. In practice noise with a gaussian pdf is usually specified, i.e.:

$$Pn(v) + 1/\sqrt{2} \ \pi e^{-(v/\sigma)^2/2} \tag{15}$$

For an error probability of about 0.002 the standard deviation ($\sigma$) of the noise should be V/6. When v increases from V/2 to 3V/2 the value for Pn(v) decreases by a factor of $e^{36}$ or $v \times 10^{15}$. For the 2Mb/s line system being considered + to − (or − to +) errors will occur on average every 548,000 years.

Setting P(+/−) and P(−/+) to zero will have the effect of including any of these errors in P(0/−) and P(0/+). The errors will therefore still make their contribution (however small) to the calculated error probability. They will just be wrongly classified. This simplification means that it is not necessary to measure P−+(Vm) and P+−(Vm).

The expression for total error probability is then:

$$Pe = P(O)[P(+/O) + P(-/O)] + P(-1)P(O/-) + P(+1)P(O/+) \tag{16}$$

$$= P(o) \int_0^V Po + (Vm) \cdot \int_{Vm}^\infty Pn(v) \cdot dv \cdot dVm + \tag{17}$$

$$P(O) \int_0^{-V} Po - (Vm) \cdot \int_{Vm}^{-\infty} Pn(v) \cdot dv \cdot dVm +$$

$$P(-1) \int_0^V P - o(Vm) \cdot \int_{Vm}^\infty Pn(v) \cdot dv \cdot dVm +$$

$$P(+1) \int_0^{-V} P + o(Vm) \cdot \int_{Vm}^{-\infty} Pn(v) \cdot dv \cdot dVm$$

P(0), P(−), and P(+) are probabilities of 0, −1, +1 in the transmitted signal.

Another simplification comes if it is assumed that P(+1)=P(−1)=P(1). This is a necessary property of any line code with no dc component in the signal. This is the usual case because the transformer coupling universally used in line regenerators cannot transmit dc.

Also it is to be assumed that the pdf of the noise Pn(v) is symmetric about a zero mean (Pn(v)=Pn(−v)). It is conceivable that in practice this might not be true. We do not, however, want a particular case but an ensemble average that is bound to be symmetric.

The integrals then become:

$$Pe = P(O) \int_O^V (Po + (Vm) + Po - (-Vm)) \cdot \int_{Vm}^\infty Pn(v) \cdot \quad (18)$$

$$dv \cdot dVm + P(1) \int_O^V (P - o(Vm) + P + o(-Vm)) \cdot$$

$$\int_{Vm}^\infty Pn(v) \cdot dv \cdot dVm$$

$$= \int_O^V (P(O)(Po + (Vm) + Po - (-Vm)) + \quad (19)$$

$$P(1)(Po - (Vm) + P + o(-Vm))) \cdot \int_{Vm}^\infty Pn(v) \cdot dv \cdot dVm$$

The second integral in the double integrals above is the complementary cummulative gaussian distribution G(x) defined as:

$$G(x) = 1/\sqrt{2} \, \pi \int_x^\infty e^{-t^2/2} dt \quad (20)$$

This is of course only where the pdf Pn(v) of the noise is Gaussian. While this may not be universal any tests specified at present use Gaussian noise, and it is by far the most common pdf met in practice.

Taking the second integral and substituting for Pn(v):

$$I = 1/\sqrt{2} \, \pi\sigma \int_{Vm}^\infty e^{-x^2/2\sigma^2} dx \quad (21)$$

Substitute $t = x/\sigma$ to normalise $$I = 1/\sqrt{2} \, \pi \int_{Vm/\sigma}^\infty e^{-t^2/2} dt = G(Vm/\sigma) \quad (22)$$

Values for I can be readily found either from tables or from polynominal approximations to G(x).

Thus the integral becomes:

$$Pe = \int_O^V (P(O)(Po + (Vm) + Po - (-Vm)) + \quad (23)$$

$$P(1)(Po - (Vm) + P + o(-Vm))) \cdot G(Vm/\sigma) \cdot dVm$$

In any practical measurement the Pxy(Vm)(x,y=0,+,−) are not found as continuous functions but as histograms. In the present case these are stored in 100 point arrays Pxx(n) n=1,2,3 ... 99,100. After the measurement Pxy(n) contains the number of times the absolute value of noise margin was found to lie between V2(n−1)/100 and V*n/100 volts. The average noise margin represented by this location is V*(n−½)/100. These arrays can then be normalised to unit area so that each location contains the probability of the noise margin lying within its limits. The integral can then be replaced by a summation:

$$P(e) = \sum_{n=1}^{100} (P/O)(Po - (n) + Po + n)) + P(1)(P + o(n) + \quad (24)$$

-continued $$P - o(n))) \cdot G(n - \tfrac{1}{2})/100^* \, V/\sigma)$$

Figure 6:
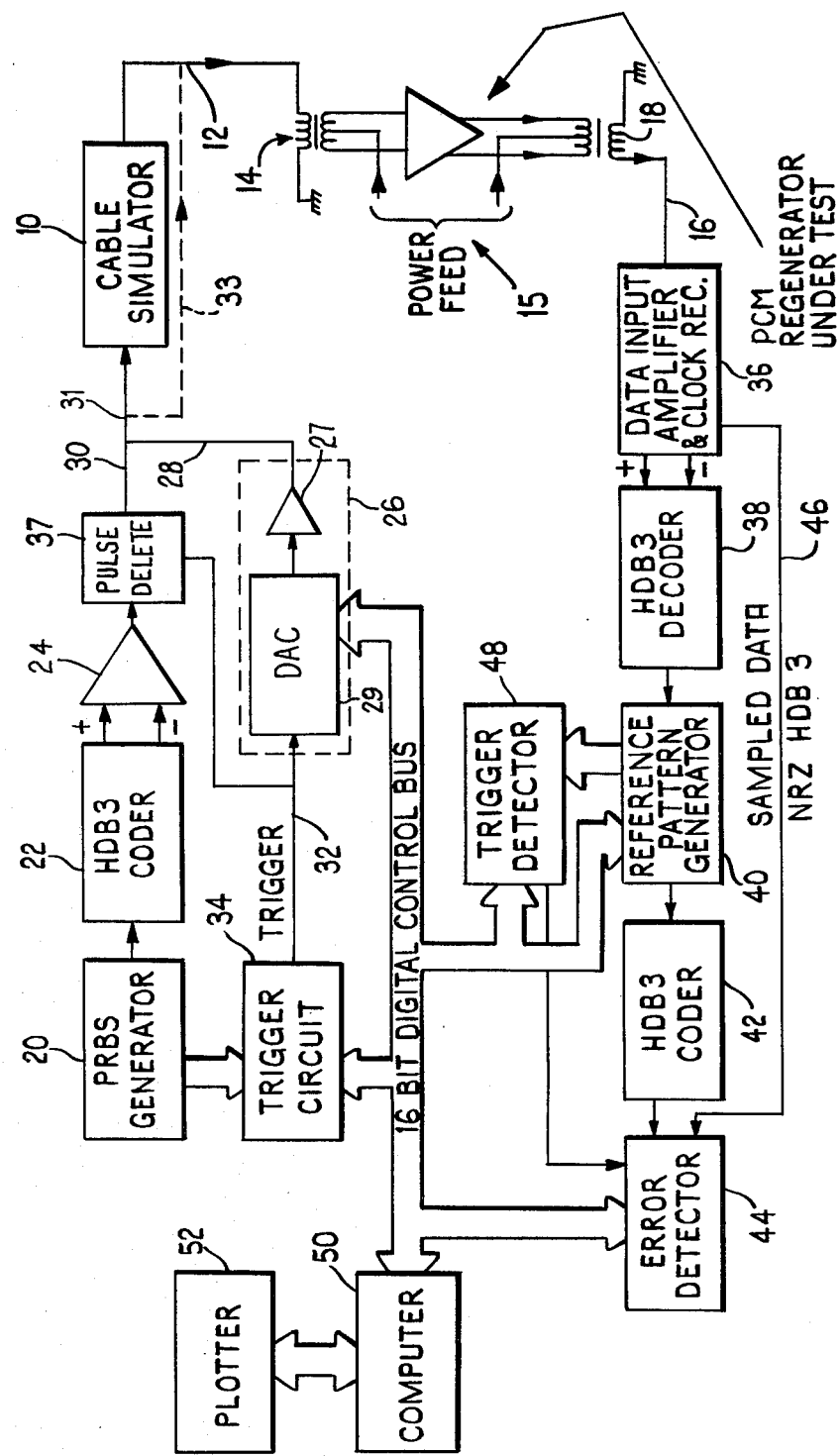
FIG. 6 is a block circuit diagram of an apparatus according to the present invention for measuring noise margins in a regenerator under test.
Figure 7:
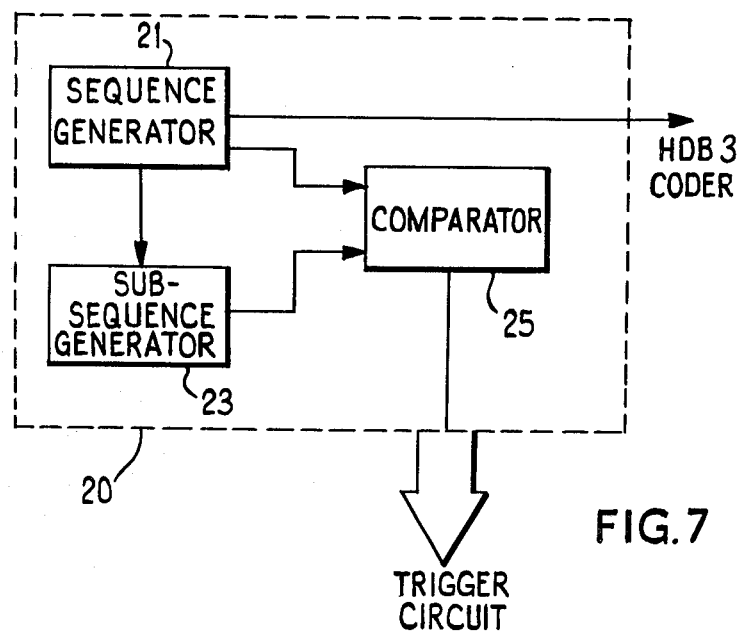
FIG. 7 is a block circuit diagram of the pseudo random binary sequence generator of FIG. 6.
Figure 8:
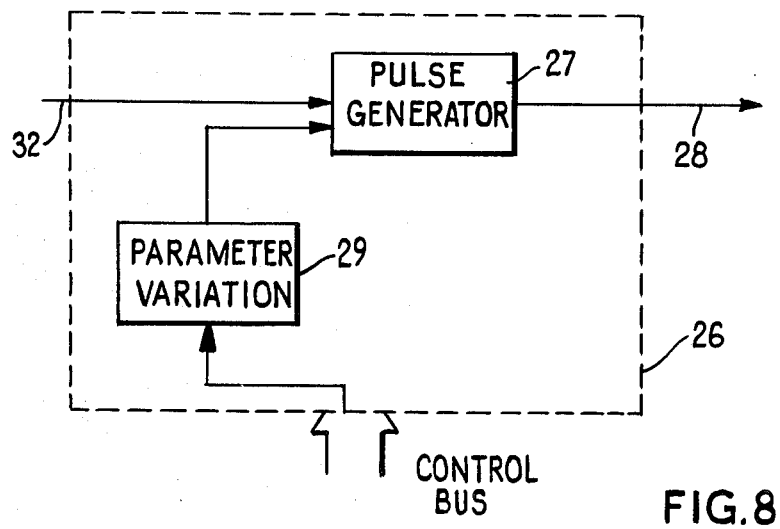
FIG. 8 is a block circuit diagram of the variable pulse generator of FIG. 6.
Figure 10A:
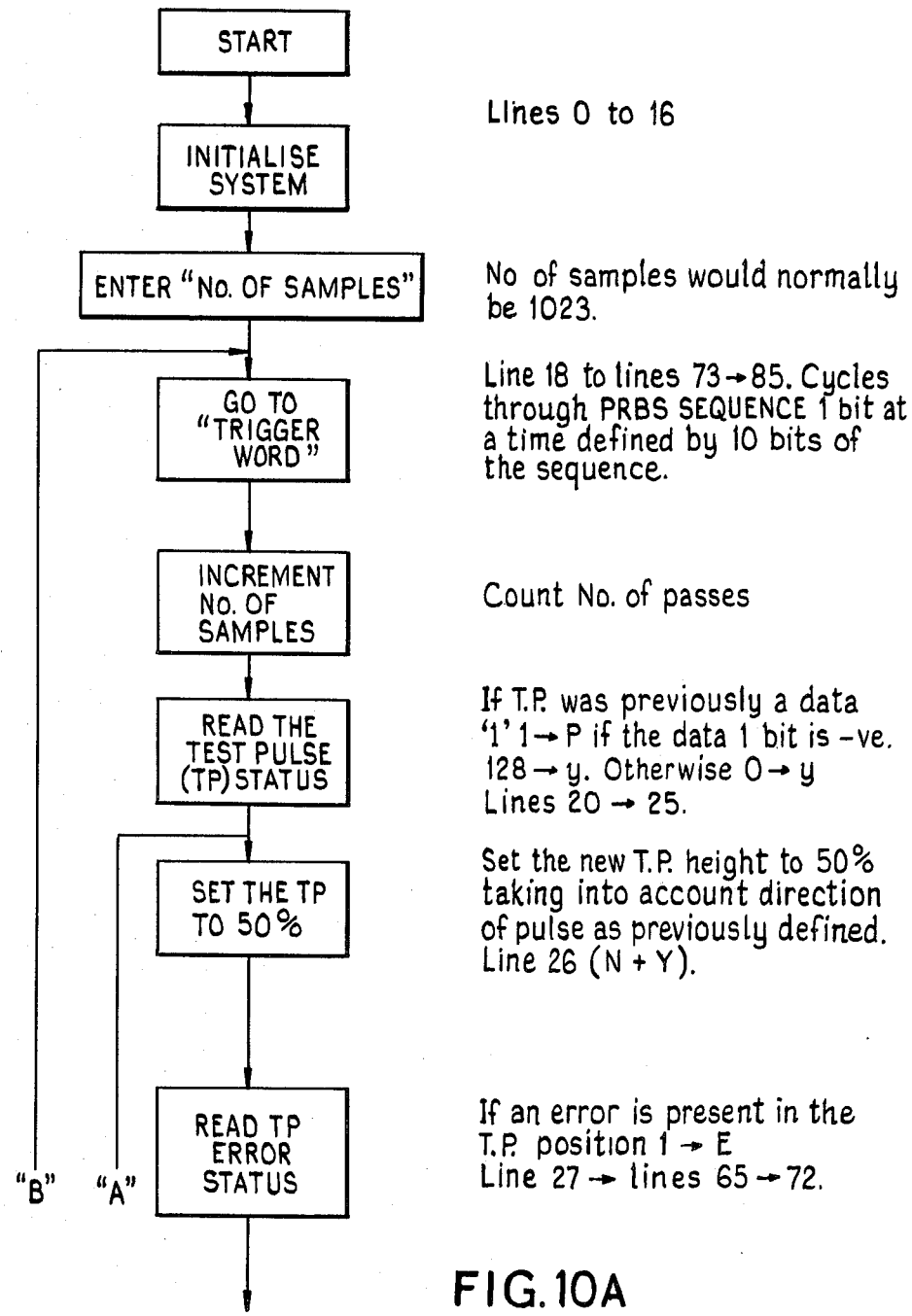
FIGS. 10($a$) to 10($f$) provide flow charts of routines for compiling test pulse histograms using a Hewlett-Packard Model 9825A Desktop Computer.
Figure 10B:
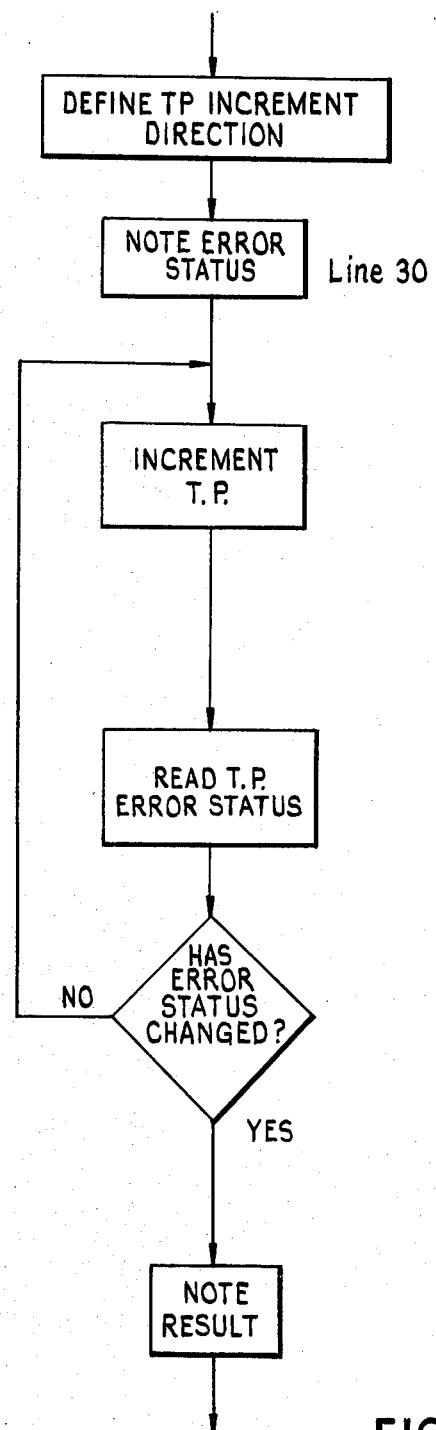
Figure 10C:
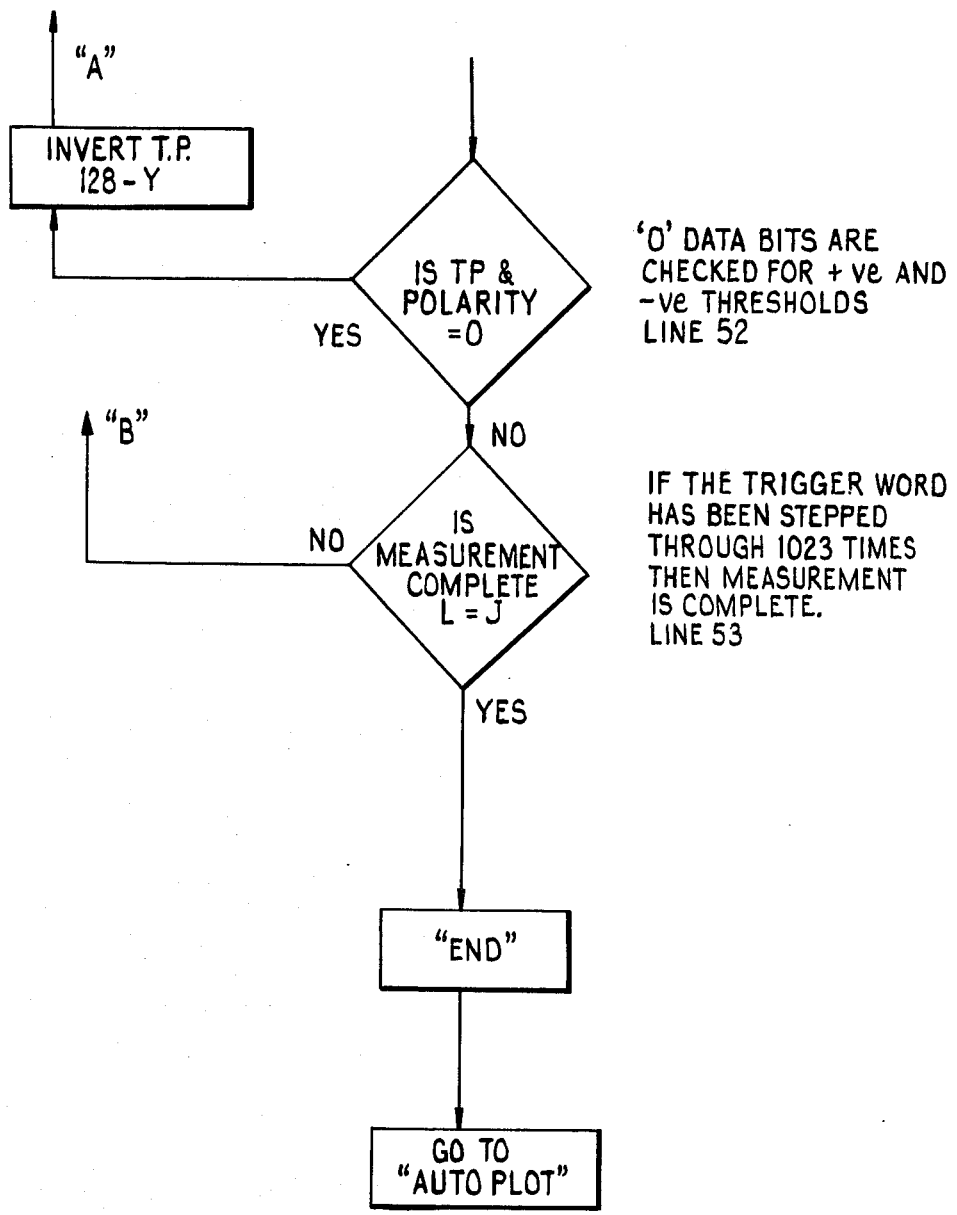
Figure 10D:
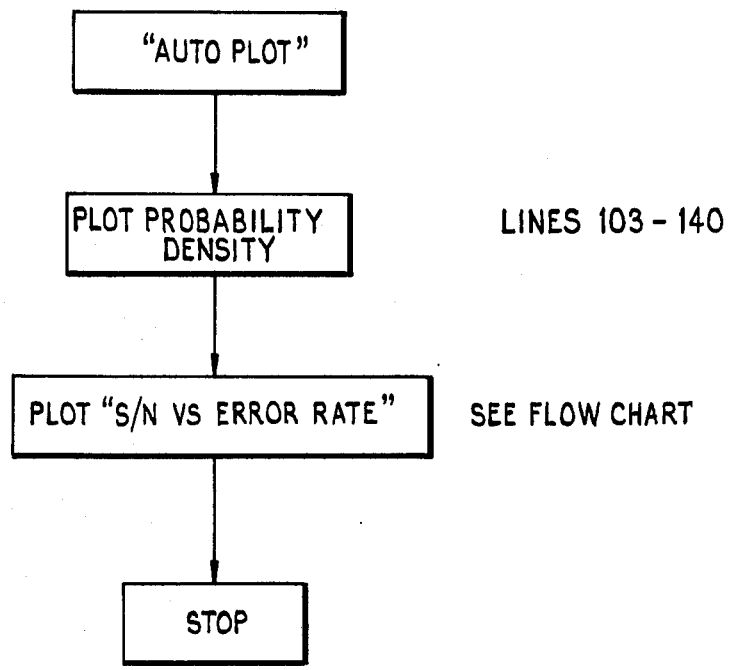
Figure 10E:
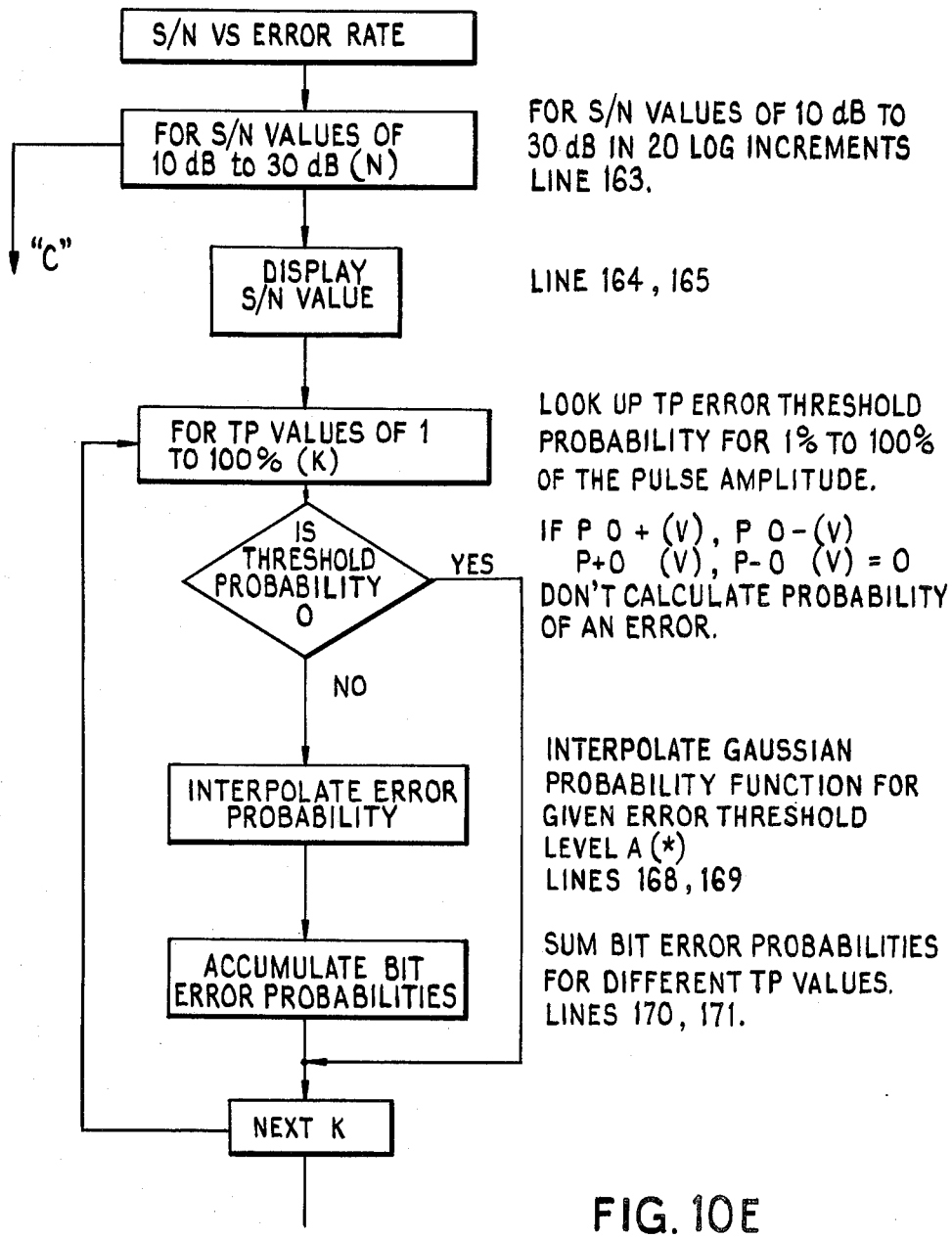
Figure 10F:
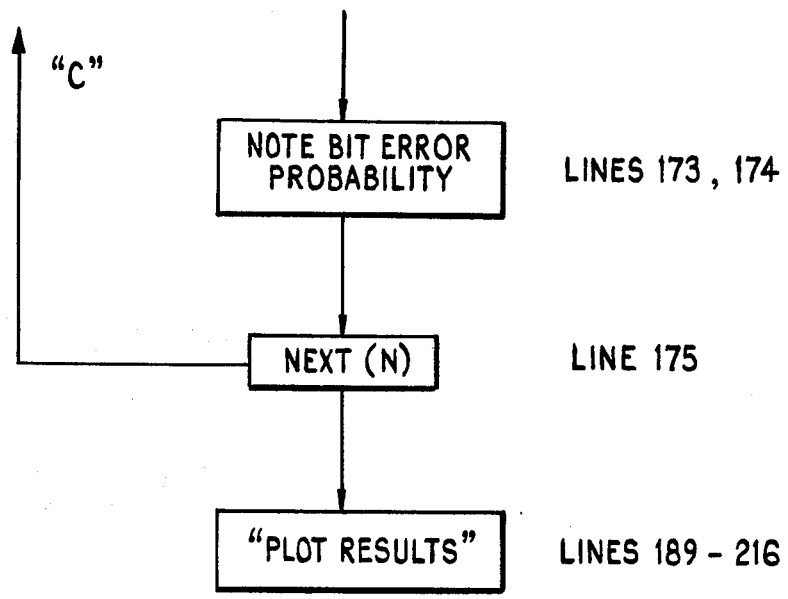

The illustrative apparatus according to the present invention is shown in FIG. 6 and as can be seen therein is arranged to measure noise margins in a pulse code modulation (PCM) regenerator under test. The regenerator is connected to receive an input from a cable simulator 10 on a line 12 via an input transformer 14 to which power is supplied by a power feed 15, and to provide an output on a line 16 via a transformer 18.

Means of the apparatus according to the present invention for providing a plurality of sequences of pulses is provided by a pseudo random binary sequence (PRBS) generator 20 (which may be provided by a Hewlett-Packard Model 3762A data generator) a sequence generator 21 of which provides sequences of pulses (for example $2^{10}$ pulses) which are representative of normal traffic through a transmission cable. The output from the PRBS generator 20 is fed to a high density bipolar (HDB) coder 22 which converts the input thereto to HDB3 code (wherein the maximum number of consecutive zeros is three). The coder 22 has positive and negative outputs to a combined output amplifier and pulse deleter 24, 37.

The output amplifier 24 provides a first amplifier of the apparatus according to the present invention, which provides a sequence of coded pulses at its output in response to an input from the HDB3 coder 22.

The apparatus according to the present invention further comprises a variable pulse generator 26 which itself comprises a second amplifier 27 having an output 28 which is connected to the output 30 of the combined output amplifier 24 and pulse deleter 37. The pulse deleter 37 provides means for inhibiting generation of a pulse (or pulses) in the sequence of pulses at a predetermined position as hereinafter described for substitution by a pulse (or pulses) from the variable pulse generator 26.

The generator 26 itself comprises a digital-to-analog converter (DAC) 29 controlled by a computer 50 for varying at least one parameter of the variable pulse (i.e. the voltage) so that the initial value of the parameter is set at a level which is selected to correspond to a predicted threshold value of two adjacent states.

The variable pulse generator 26 and the pulse deleter 37 are both initiated by a trigger circuit 34 in response to generation, by a subsequence generator 23 of the PRBS generator 20, of a predetermined subsequence of the sequence of pulses to establish identity in a comparator 25 between the subsequence and a subsequence portion of the sequence of pulses.

The inhibition of the generation of a pulse in the sequence of pulses is achieved in response to identity between the subsequence and the subsequence portion of the sequence, and in the sequence which is provided on the combined output line 31, the deleted pulse is replaced by the variable pulse from the generator 26. According to the parameter of the pulse which is to be monitored, the voltage level, for example, or the timing, duration, phase, frequency or amplitude, can be varied.

As desired, the sequence of pulses containing the variable pulse can then be fed to the cable simulator 10 (or can bypass the cable simulator as indicated by the dotted line 33 in the event that the cable simulator is not required, as for example when a memory or storage device is under test or the transmission medium is free space). With the sequence fed through the simulator 10, the output sequence therefrom is attenuated and has intersymbol interference (ISI) added thereto in the same manner as would a transmission cable itself. This sequence of pulses is then passed through a regenerator under test via a first transformer 14, and then via a second transformer 18 and a line 16 to a combined data input amplifier and clock recovery circuit 36, where a clock signal is recovered and the signal provided by the pulse sequence is amplified and passed on positive and negative outputs to an HDB3 decoder 38.

Power is supplied to the regenerator under test from a power feed connected to centre taps of the secondary winding and primary winding of the first and second transformers 14 and 18 respectively. If, of course, the regenerator is one which is the last in a line, it will not have an output transformer but a single line output instead.

The output of the HDB3 decoder 38 should, in the absence of errors, be identical to the pattern produced by the PRBS generator 20. The reference pattern generator 40 controlled by the computer 50 can be commanded to synchronize itself to the output from the decoder 38. Its output is then designed to be a fixed number of clock periods in advance of the pattern on the line 46 such that after the coder 42 the two patterns are in synchronism and errors are detected by comparing the output from the coder 42 with that on the line 46. A trigger detector 48 connected to the pattern generator 40 produces a trigger at substantially the same position within the reference sequence as the variable pulse position within the pattern on the output 31. Its timing is such as to classify errors detected in the error detector 44 according to their position within the sequence, that is whether they occur at the position of the variable pulse or elsewhere. Errors occurring elsewhere are taken as a sign of loss of synchronization.

To compare two HDB3 encoded signals requires two lines for each signal, one for positive pulses one for negative, and therefore requires two error detectors or comparators. This can be simplified without loss of accuracy by 'OR'ing the two lines for each signal together into one. Only one comparator is then needed. This is why only one line 46 is shown from the amplifier 36 to the detector 44 and why the coder 42 has a single output.

The amplifier/clock recovery 36, the decoder 38 and the reference pattern generator 40 could be provided by a modified Hewlett-Packard 3763A error detector. Because this incorporates its own synchronization logic, the trigger detector 48 is not required. Access to internal circuit nodes is needed to obtain line 46 and the output equivalent to that from the generator 40. These with appropriate timing delays could then be connected to the coder 42 and the detector 44.

The computer 50 and plotter 52 provide means for determining which state of a number of possible output states of the variable pulse is indicated by the value of the output of the detector 44, the plotter 52 providing a visual record of the accumulated values. The value of the variable parameter of the variable pulse can also be monitored, and differences between the output from the regenerator and the reference sequence, according to position in time, can be compared to the output from the trigger detector 48.

Data which is accumulated by the computer 50 as to variations of the parameter of the variable pulse can be interpreted as deviations from a standard to determine probability distributions of the deviations, and this information can be used to adjust the initial value of the parameter. The computer 50 may be a Hewlett-Packard Model 9825A Desktop Computer, and the plotter 52 may be a Hewlett-Packard Model 7225A Graphics Plotter coupled to the Desktop Computer by a Hewlett-Packard Interface Bus HP-IB (IEEE 488-1975).

Digital radio is another potential application for this technique. The most common systems use 2, 4 or 8 phase Phase Shift Keying (PSK) modulation. Here there are n states (n=2, 4, 8), each distinguished by a unique transmitted carrier phase or phase shift from the previous state (for Differential PSK). With a suitable phase modulator and appropriate driving waveforms exactly the same treatment as before can lead to similar methods for predicting error rate. The transmitted carrier would be phase modulated with a known sequence that led to a repetitive sequence of transmitted carrier phases. One chosen state within that sequence would then be modified by shifting its phase first in one direction then in the other. This will build up histograms of noise margin as before, except that these would be scaled in terms of degrees rather than in volts. Each of the n states will have two histograms associated with it, one for the noise margin to each adjacent state.

APPENDIX

The appendix is the program which was used in the Hewlett-Packard Model 9825A Desktop Computer in carrying out a method according to the present invention.

APPENDIX

```
0: "TRK 0 FILE2";prt "TP HISTOGRAM"
1: dim P[102],Q[102],R[102],S[102]
2: dim T[102],U[102],A[102],F[102],L[102],R,S
3: trk 1;rew;ldf 1,A[*];ldf 2,R,S;trk 0
4: "START":
5: time 3000
6: if bit(0,R)=1;10⊃U;gto +2;if bit(4,R)=1;15⊃U;jmp 2
7: cfg 13;ent "PRBS n=10/15",U;if flg13;10⊃U
8: if A[1]=0;trk 1;rew;ldf 1,A[*];trk 0
9:
```

```
10: wti 0,2
11:
12:
13:
14: "PLOTTER";wrt 705,"IP520,380,11200,7840"
15: 1)A;0)B)I)L)r1)r2)r3)r4)r5)r6)r7)r8)r9)r10;4)r18
16: if bit(0,R)=1;2^U-1)J;jmp 2
17: cfg 13;ent "No of Samples",J;if flg13;2^U-1)J
18: gsb "TRIGGER WORD"
19: L+1)L
20: wti 6,cmp3*256
21: cmprdb(2))X
22: if bit(0,X)=0;gto 21
23: 0)Y
24: bit(2,X))P
25: if P=1;bit(1,cmpX)*128)Y
26: 50)N;wti 6,cmp2*256;wtb 2,cmp(N+Y)
27: gsb "ERRORS"
28: if P=0;1)I;if E=1;-1)I
29: if P=1;-1)I;if E=1;1)I
30: E)r21
31: N+I)N;wti 6,cmp2*256;wtb 2,cmp(N+Y)
32: gsb "ERRORS"
33: if E=r21;if N#1;if N#100;gto 31
34: Y+I+E)r20
35: if P=1;gto "P=1"
36: "P=0":
37: if r20=-1;P[N+1]+1)P[N+1];r1+1)r1;gto 52
38: if r20=2;P[N]+1)P[N];r1+1)r1;gto 52
39: if r20=127;Q[N+1]+1)Q[N+1];r2+1)r2;gto 52
40: if r20=130;Q[N]+1)Q[N];r2+1)r2;gto 52
41: if N=1;dsp "NO 0 ERROR";stp
42: if N=100;dsp "NO 0 ERROR";stp
43: gto 31
44: "P=1":
45: if r20=1;R[N]+1)R[N];r3+1)r3;gto 52
46: if r20=0;R[N+1]+1)R[N+1];r3+1)r3;gto 52
47: if r20=129;S[N]+1)S[N];r4+1)r4;gto 52
48: if r20=128;S[N+1]+1)S[N+1];r4+1)r4;gto 52
49: if N=1;dsp "NO 1 ERROR";stp
50: if N=100;dsp "NO 1 ERROR";stp
51: gto 31
52: if P=0;if Y=0;128)Y;gto 26
53: if L=J;dsp "MEASUREMENT COMPLETE";beep;4)r18;gto "END"
54: gto 18
55: "END":
56: gsb "AUTO PLOT"
57: if bit(0,R)=1;gto "NEW MEASUREMENT"
58: stp
59: "NEW MEASUREMENT":
60: if bit(0,R)=1;jmp 3
61: cfg 13;ent "rcf No for DATA",r1;if flg13;jmp 2
62: trk 1;rew;rcf r1,P[*],Q[*],R[*],S[*];trk 0
63: trk 1;rew;rcf 3,P[*],Q[*],R[*],S[*];trk 0
```

```
64: if bit(8,R)=1;jmp 2
65: trk 0;rew;ldp 4,0
66: trk 0;rew;ldp 3,0
67: "ERRORS";0)E)C
68: wti 6,cmp5*256
69: cmprdb(2))Q
70: C+1)C
71: if C=8;cll 'SYNC LOSS';gto 67
72: if ior(bit(2,cmpQ),bit(1,Q))=1;gto 69
73: if bit(0,Q)=1;1)E
74: ret
75: "TRIGGER WORD";
76: if L=0;gto 83
77: if U=10;eor(bit(0,A),bit(3,A)))Z
78: if U=15;eor(bit(0,A),bit(1,A)))Z
79: shf(A,1))A
80: if Z=0;gto 82
81: A+2^(U-1))A
82: int(A/256))B
83: wti 6,cmp0*256;dsp "GATING"
84: wtb 2,cmpA
85: wti 6,cmp1*256
86: wtb 2,cmpB+int(U/15)*128
87: ret
88: "SYNC LOSS";
89: dsp "SYNC LOSS"
90: wti 6,cmp4*256;wtb 2,cmp0
91: 0)C
92: ret
93: "AUTO PLOT";
94: psc 705;pclr
95: pen# 1;1)r18;cll 'PROB DENSITY'
96: pen# 2;0)r18;.25*r9)r100;cll 'PROB DENSITY
97: pen# 1;0)r100;cll 'PLOT SCALE'
98: pen# 3;2)r18;cll 'S/N vs ERROR RATE'
99: pen# 4;cll 'PLOT REF 2'
100: pen# 3;cll 'PLOT SCALE 2'
101: pen# 0
102: dsp "FINISHED";ret
103: "PROB DENSITY";0)r7
104: r1+r3)r5;r2+r4)r6
105: if r18=4;ent "'1' or '0' plot",r18
106: fxd 0;dsp "PROB DENSITY type",r18
107: for K=1 to 100
108: if r18=0;100*P[K]/r5)T[K]
109: if r18=0;100*Q[K]/r6)U[K]
110: if r18=1;100*R[K]/r5)T[K]
111: if r18=1;100*S[K]/r6)U[K]
112: P[K]+R[K])r35
113: Q[K]+S[K])r36
114: max(r35,r36,r7))r7
115: if r18=2;100*r35/r5)T[K]
116: if r18=2;100*r36/r6)U[K]
117: next K
```

```
118: 100*r7/r5)r8;100*r7/r6)r9;max(r8,r9))r9
119: 5*int(r9/5)+5)r9;if r9>20;10*int(r9/10)+10)r9;if r9>100;
     100)r9
120: cll 'PLOT RESULTS'
121: ret
122: "PLOT RESULTS":
123: psc 705
124: pclr
125: scl 2,-2.2,-1*r9,2*r9
126: lim
127: line
128: ofs 0,r100
129: plt -1,0,1
130: for K=100 to 1 by -1
131: if K<100;plt -(K+.5)/100,U[K+1],2
132: plt -(K+.5)/100,U[K],2
133: next K
134: for K=1 to 100
135: if K>1;plt (K-.5)/100,T[K-1],2
136: plt (K-.5)/100,T[K],2
137: next K
138: plt -2.2,2*r9,1
139: 0)r100
140: ret
141: "PLOT SCALE":
142: psc 705;pclr
143: scl 2,-2.2,-1*r9,2*r9
144: ofs 0,r100
145: wrt 705,"TL1,0"
146: csiz 1,2,1;fxd 1
147: xax 0,.1,-1,1,5
148: wrt 705,"TL.5,.5"
149: fxd 0
150: if r9<21;yax 0,1,0,r9;yax -1.12,5,0,r9,-1
151: if r9>20;yax 0,5,0,r9;yax -1.12,.5*r9,0,r9,-1
152: plt -1,0,1;plt -1,r9,2;plt 1,r9;plt 1,0,-1
153: csiz 1,2,1,180
154: plt -.4,-.2*r9,1;lbl "fraction of pulse height"
155: csiz 1,2,1,90
156: plt -1.15,.2*r9,1;lbl "probability density"
157: plt -2.2,2*r9,1
158: 0)r100
159: ret
160: "S/N vs ERROR RATE":0)Q)F
161: if r18=4;ent "'1' or '0' plot",r18
162: r1+r3)r5;r2+r4)r6
163: for N=10^.5 to 10^1.5+1e-6 by (10^1.5-10^.5)/20
164: fmt 1,"TYPE",f1.0,2x,"pkS/rmsN(dB)",f6.2
165: wrt .1,r18,20log(N)
166: for K=1 to 100
167: if P[K]+R[K]+Q[K]+S[K]=0;gto 172
168: if r18#1;(K/100-.005)*N)X;cll 'INTERPOLATE';M)D
169: if r18#0;(1-(K/100-.005))*N)X;cll 'INTERPOLATE';M)E
170: if r18#1;F+(P[K]+Q[K])D/J)F
```

```
171: if r18#0;F+(R[K]+S[K])E/J)F
172: next K
173: Q+1)Q
174: 20log(N))L[Q];F)F[Q];if log(F)<-15;jmp 2
175: 0)F;next N
176: cll 'PLOT RESULTS 2'
177: ret
178: "INTERPOLATE":if X>5;gto 184
179: int(10*X))Y
180: A[Y+2]-A[Y+1])G
181: X*10-Y)H
182: G*(1-H)+(1-A[Y+2]))M
183: ret
184: int(X))Y;if Y>19;1e-90)M;ret
185: A[50+Y]-A[49+Y])G
186: X-Y)H
187: 10^(-(G*H+A[49+Y]))M
188: ret
189: "PLOT RESULTS 2":
190: psc 705;pclr
191: scl 0,-18,8,30
192: lim 0,-15,10,30
193: line
194: plt log(F[1]),L[1],1
195: for N=1 to Q
196: plt log(F[N]),L[N],2
197: next N
198: csiz 2,2,1,90
199: plt -2,20,1;plt -2,22,2;lbl " Spk/Nrms"
200: Q-1)Q;lim ;plt -18,30,1
201: ret
202: "PLOT SCALE 2":
203: psc 705;pclr;fmt
204: scl 0,-18,8,30
205: csiz 1,2,1;fxd 0
206: wrt 705,"TL.7,0";yax 0,1,10,30
207: wrt 705,"TL0,1";xax 30,-1,0,-15
208: wrt 705,"TL1,0";xax 10,-1,0,-15,1
209: wrt 705,"TL0,.7";yax -15,1,10,30;yax -15.6,5,10,30,-1
210: csiz 2,2,1,-180
211: plt -10,8.5,1;lbl "log error rate"
212: csiz 2,2,1,90
213: plt -16,18,1;lbl "S/N (dB)"
214: plt .25,10,1;lbl "HP 3786A bit error probability"
215: plt -18,30,1
216: ret
217: "PLOT REF 2":0)Q
218: if r18#4;.5)r21)r22;jmp 3
219: ent "fraction of pulse k(+)",r21
220: ent "fraction of pulse k(-)",r22
221: psc 705;pclr
222: scl 0,-18,8,30
223: lim 0,-15,10,30
224: plt 0,10,1
```

```
225: line 2
226: for N=10^.5 to 10^1.5+1e-6 by (10^1.5-10^.5)/20
227: r21*N)X
228: cll 'INTERPOLATE'
229: M)r23
230: r22*N)X
231: cll 'INTERPOLATE'
232: M)r24
233: (1-r21)*N)X
234: cll 'INTERPOLATE'
235: M)r25
236: (1-r22)*N)X
237: cll 'INTERPOLATE'
238: M)r26
239: .449*(r23+r24))r11
240: .276*(r25+r26))r13
241: Q+1)Q
242: r11+r13)F[Q];20log(N))L[Q]
243: log(r11+r13))r15
244: plt r15,L[Q];if r15<-15;jmp 2
245: next N
246: csiz 2,2,1,90
247: plt -3,20,1;plt -3,22,2;lbl " Spk/Nrms ref"
248: lim ;plt -18,30,1
249: ret
250: "PRINT RESULTS":
251: dsp "PRINT RESULTS"
252: fmt 1,3x,f5.2,3x,e8.2,3x,f5.2,3x,e8.2
253: fmt 2,3x,c,4x,c,8x,c,4x,c
254: wrt 719.2,"(dB)","BER","(db)","BER"
255: wrt 719
256: for N=1 to Q by 2
257: if frc(Q/2))0;for N=1 to Q-1 by 2
258: wrt 719.1,L[N],F[N],L[N+1],F[N+1]
259: next N
260: if frc(Q/2))0;wrt 719.1,L[Q],F[Q]
261: fmt 3,30/;wrt 719.3
*8929
```

What is claimed is:

1. A method of measuring noise margins in a digital transmission system comprising a receiver, the method comprising the steps of:
   (a) providing a pulse of a specified state and at least one parameter of which can be varied, within a sequence of pulses, which sequence is repeatable and is generated to be representative of normal traffic along a given transmission path of the system;
   (b) varying the value of said at least one parameter of said pulse until said pulse when varied is such that it can be detected by a detector circuit of the system;
   (c) detecting said pulse when varied, prior to any error correction thereof by an in-built error correction means of the system;
   (d) repeating steps (a), (b) and (c) by providing said pulse at a different predetermined and repeatable position in said sequence, for each repetition, and detecting change of state of said pulse at each position; and
   (e) accumulating the value of the variations of said at least one parameter as deviations from a selected reference value for each pulse position to determine the probability distribution of said deviations.

2. A method according to claim 1 wherein said specified state of said pulse is one of n possible states and steps (a) to (e) are repeated for each of said n possible states, the variation of said at least one parameter being such as to allow a detected state to be any one of said n possible states, and the method also comprising the step of further classifying the parameter variations according to the detected states and said each of said n states prior to the accumulating step.

3. A method according to claim 2 wherein the step of providing said pulse comprises providing said sequence of pulses and inserting said pulse into said sequence of pulses in place of a pulse at a predetermined position in said sequence of pulses.

4. A method according to claim 3 wherein an initial value of said at least one parameter is set at a level selected to correspond to a predicted probable detector threshold value between two adjacent states, and data accumulated from step (e) is used to adjust said initial value of said at least one parameter when necessary.

5. A method according to claim 4 wherein step (c) comprises generating a reference sequence of pulses as an output from a pseudo random sequence generator and synchronously comparing this reference sequence with the sequence in the system, and detecting differences between the two sequences.

6. A method according to claim 4 where step (c) comprises, for a coded sequence, examining the sequence in the system to establish that the pulses within the sequence conform to the code of said coded sequence.

7. A method according to claim 1 wherein the step of providing said pulse comprises providing said sequence of pulses and inserting said pulse into said sequence of pulses in place of a pulse at a predetermined position in said sequence of pulses.

8. A method according to claim 7 wherein an initial value of said at least one parameter is set at a level selected to correspond to a predicted probable detector threshold value between two adjacent states, and data accumulated from step (e) is used to adjust said initial value of said at least one parameter when necessary.

9. A method according to claim 8 wherein step (c) comprises generating a reference sequence of pulses as an output from a pseudo random sequence generator and synchronously comparing this reference sequence with the sequence in the system, and detecting differences between the two sequences.

10. A method according to claim 8 wherein step (c) comprises, for a coded sequence, examining the sequence in the system to establish that the pulses within the sequence conform to the code of said coded sequence.

11. A method according to claim 1 wherein an initial value of said at least one parameter is set at a level selected to correspond to a predicted probable detector threshold value between two adjacent states, and data accumulated from step (e) is used to adjust said initial value of said at least one parameter when necessary.

12. A method according to claim 11 wherein step (c) comprises generating a reference sequence of pulses as an output from a pseudo random sequence generator and synchronously comparing this reference sequence with the sequence in the system, and detecting differences between the two sequences.

13. A method according to claim 11 wherein step (c) comprises, for a coded sequence, examining the sequence in the system to establish that the pulses within the sequence conform to the code of said coded sequence.

14. A method according to claim 1 wherein said digital transmission system comprises a pulse code modulation regenerator.

15. Apparatus for use in measuring noise margins in a digital transmission system comprising a receiver, the apparatus comprising:
(a) pulse sequence providing means, having an output, for providing a sequence of pulses which is substantially repeatable and is generated to be representative of normal traffic to the receiver of the system;
(b) variable-pulse providing means, having an output connected to the output of the pulse sequence providing means, for providing a variable pulse to be inserted at a predetermined position in said sequence of pulses;
(c) variable-pulse moving means, coupled with the variable-pulse providing means, for moving the variable pulse from one position to another within said sequence of pulses;
(d) value varying means, coupled with the variable pulse providing means, for varying the value of at least one parameter of said variable pulse;
(e) output examining means, coupled with the output of a detector of the system, for examining the output from the detector to which said sequence, including said variable pulse, has been fed;
(f) state determining means, coupled with the output from the detector, for determining which state of a number of possible output states of said variable pulse is indicated by the value of said output of said detector;
(g) value monitoring means, coupled with the output from the detector, for monitoring the value of said at least one parameter while examining said output from said detector; and
(h) accumulator means, coupled with the value monitoring means, and with the state determining means, for accumulating values of deviations of said at least one parameter from a selected reference value for each pulse position to determine the probability distribution of said deviations.

16. Apparatus according to claim 15 wherein said pulse sequence providing means comprises a first amplifier arranged to provide said sequence of pulses as its output in response to an input to said pulse sequence providing means from a pseudo random sequence generator, and said variable-pulse providing means comprises a second amplifier whose output is connected to said output of said first amplifier.

17. Apparatus according to claim 16 wherein subsequence generator means, coupled with the pulse sequence providing means, is provided for generating a predetermined subsequence of said sequence and said variable-pulse providing means is triggerable by unique identity between said subsequence and a subsequence portion of said sequence.

18. Apparatus according to claim 17 wherein inhibitor means, coupled with the pulse sequence providing means, is provided for inhibiting generation of a pulse in said sequence at said predetermined position in response to said unique identity between said subsequence and said subsequence portion of said sequence.

19. Apparatus according to claim 18 wherein said value varying means comprises data processing means and a digital-to-analog converter coupled therewith and controlled by said data processing means.

20. Apparatus according to claim 19 wherein the system further comprises a transmitter which comprises a sequence generator having an output, a trigger detector connected to said output and said first and second amplifiers.

21. Apparatus according to claim 20 wherein said monitoring means comprises a sequence generator and a trigger detector substantially identical to said sequence generator and said trigger detector of said transmitter, for generating a reference sequence, trigger detection occurring at substantially the same position in said reference sequence as occurs in the transmitted sequence, receiving and synchronizing means is provided for receiving and synchronizing the output of the sequence generator of said monitoring means with the output from said transmission system under test, and receiving and comparing means is provided for receiving and comparing said output from said digital transmission system under test with said reference sequence.

22. Apparatus according to claim 21 wherein classifying means, coupled with the receiving and comparing means, and with said output from said trigger detector, is provided for classifying differences between said output and said reference sequence according to position in time compared to said output from said trigger detector of said monitoring means.

23. Apparatus according to claim 22 wherein a transmission line is provided between said receiver and said transmitter, which is capable of transmitting a variable pulse.

24. Apparatus according to claim 15 wherein means, coupled with the means for providing a sequence of pulses, is provided for generating a predetermined subsequence of said sequence and said means for providing said variable pulse is triggerable by unique identity between said subsequence and a subsequence portion of said sequence.

25. Apparatus according to claim 24 wherein means, coupled with the means for providing a sequence of pulses, is provided for inhibiting generation of a pulse in said sequence at said predetermined position in response to said unique identity between said subsequence and said subsequence portion of said sequence.

26. Apparatus according to claim 25 wherein said means for varying said at least one parameter of said variable pulse comprises a digital-to-analog converter controlled by data processing means.

27. Apparatus according to claim 26 wherein the system further comprises a transmitter which comprises a sequence generator having an output, a trigger detector connected to said output and said first and second amplifiers.

28. Apparatus according to claim 27 wherein said means for monitoring said value of said at least one parameter comprises a sequence generator and a trigger detector substantially identical to said sequence generator and said trigger detector of said transmitter, for generating a reference sequence, trigger detection occurring at substantially the same position in said reference sequence as occurs in the transmitted sequence, means is provided for receiving and synchronizing the output of the sequence generator of said monitoring means with the output from said transmission system under test, and means is provided for receiving and comparing said output from said digital transmission system under test with said reference sequence.

29. Apparatus according to claim 28 wherein means, coupled with the means for receiving and comparing said output with said reference sequence, and with said output from said trigger detector, is provided for classifying differences between said output and said reference sequence according to position in time compared to said output from said trigger detector of said monitoring means.

30. Apparatus according to claim 29 wherein a transmission line is provided between said receiver and said transmitter, which is capable of transmitting a variable pulse.

31. Apparatus according to claim 16 wherein the system further comprises a transmitter which comprises a sequence generator having an output, a trigger detector connected to said output and said first and second amplifiers.

32. Apparatus according to claim 31 wherein said means for monitoring said value of said at least one parameter comprises a sequence generator and a trigger detector substantially identical to said sequence generator and said detector of said transmitter, for generating a reference sequence, trigger detection occurring at substantially the same position in said reference sequence as occurs in the transmitted sequence, means is provided for receiving and synchronizing the output of the sequence generator of said monitoring means with the output from said transmission system under test, and means is provided for receiving and comparing said output from said digital transmission system under test with said reference sequence.

33. Apparatus according to claim 32 wherein means, coupled with the means for receiving and comparing said output with said reference sequence, and with said output from said trigger detectors, is provided for classifying differences between said output and said reference sequence according to position in time compared to said output from said trigger detector of said monitoring means.

34. Apparatus according to claim 33 wherein a transmission line is provided between said receiver and said transmitter, which is capable of transmitting a variable pulse.

35. Apparatus according to claim 15 wherein said digital transmission system comprises a pulse code modulation regenerator.

36. A method of predicting error probability in a digital transmission system, the method comprising:
  (i) determining probable noise margin distribution in the system, as necessary, by carrying out steps (a) to (e) of claim 1;
  (ii) for each state and for each distribution relating to that state, quantizing the deviations into ranges of values;
  (iii) for each range of values, determining the error probability, contributed to total error probability in the system, by all values within each range; and
  (iv) summing the error probabilities for each range of values within each distribution for each state.

37. A method according to claim 36 wherein said specified state of said pulse is one of n possible states and steps (a) to (e) are repeated for each of said n possible states, the variation of said at least one parameter being such as to allow a detected state to be any one of said n possible states, and the method also comprising the step of further classifying the parameter variations according to the detected states and said each of said n states prior to the accumulating step.

* * * * *